United States Patent
Monson

(10) Patent No.: US 6,543,590 B1
(45) Date of Patent: Apr. 8, 2003

(54) PASSIVE COLLISION DAMPING DEVICE

(75) Inventor: Robert J. Monson, St. Paul, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/953,168

(22) Filed: Sep. 17, 2001

(51) Int. Cl.[7] .................................................. F16F 9/30
(52) U.S. Cl. ........................ 188/268; 188/378; 267/136; 267/139
(58) Field of Search .................... 188/268, 378–380, 188/382, 266, 267.2, 371–377; 267/136, 140.14, 139–140; 248/562, 636, 638; 74/574; 293/134, 132; 473/520, 523

(56) References Cited

U.S. PATENT DOCUMENTS

| | | | |
|---|---|---|---|
| 1,294,467 A | | 2/1919 | Hovas |
| 2,155,052 A | | 4/1939 | Byland |
| 2,417,347 A | * | 3/1947 | Brown |
| 2,732,040 A | * | 1/1956 | DeVost et al. ............... 188/268 |
| 2,869,700 A | | 1/1959 | Bowden |
| 3,456,782 A | | 7/1969 | Miller |
| 3,637,051 A | * | 1/1972 | Paihe et al. ................. 188/268 |
| 3,899,100 A | | 8/1975 | Rigaud |
| 3,938,625 A | | 2/1976 | Redermacher et al. |
| 4,289,419 A | * | 9/1981 | Young et al. .................. 404/6 |
| 4,350,233 A | * | 9/1982 | Buckley ...................... 188/268 |
| 4,557,466 A | * | 12/1985 | Zucker ...................... 256/13.1 |
| 4,706,788 A | * | 11/1987 | Inman et al. ............... 188/378 |
| 4,858,738 A | | 8/1989 | Novoa |
| 4,934,661 A | * | 6/1990 | Denman et al. |
| 5,020,644 A | | 6/1991 | Novoa |
| 5,306,100 A | | 4/1994 | Higginbotham |
| 5,486,078 A | | 1/1996 | Wise et al. |
| 6,401,628 B1 | * | 6/2002 | Sebata et al. |
| 121,414 A1 | * | 9/2002 | Barcock et al. ............. 188/268 |

FOREIGN PATENT DOCUMENTS

| | | | |
|---|---|---|---|
| JP | 12148 | * | 1/2002 |
| SU | 1084504 A | | 4/1984 |
| SU | 1392277 A | | 4/1988 |

* cited by examiner

*Primary Examiner*—Douglas C. Butler
(74) *Attorney, Agent, or Firm*—Patrick M. Hogan; Glenn W. Bowen

(57) ABSTRACT

A circular cylindrical container having sealed ends provides a device for dissipating mechanical forces. The container is filled with particulate material and has circular wheel-like structures having rims and spokes located in the interior of the container in which the rim circumferences of the wheel-like structures increase as they are located further and further away from the centroid of the container along the elongated axis of the container toward one of the sealed ends.

1 Claim, 1 Drawing Sheet

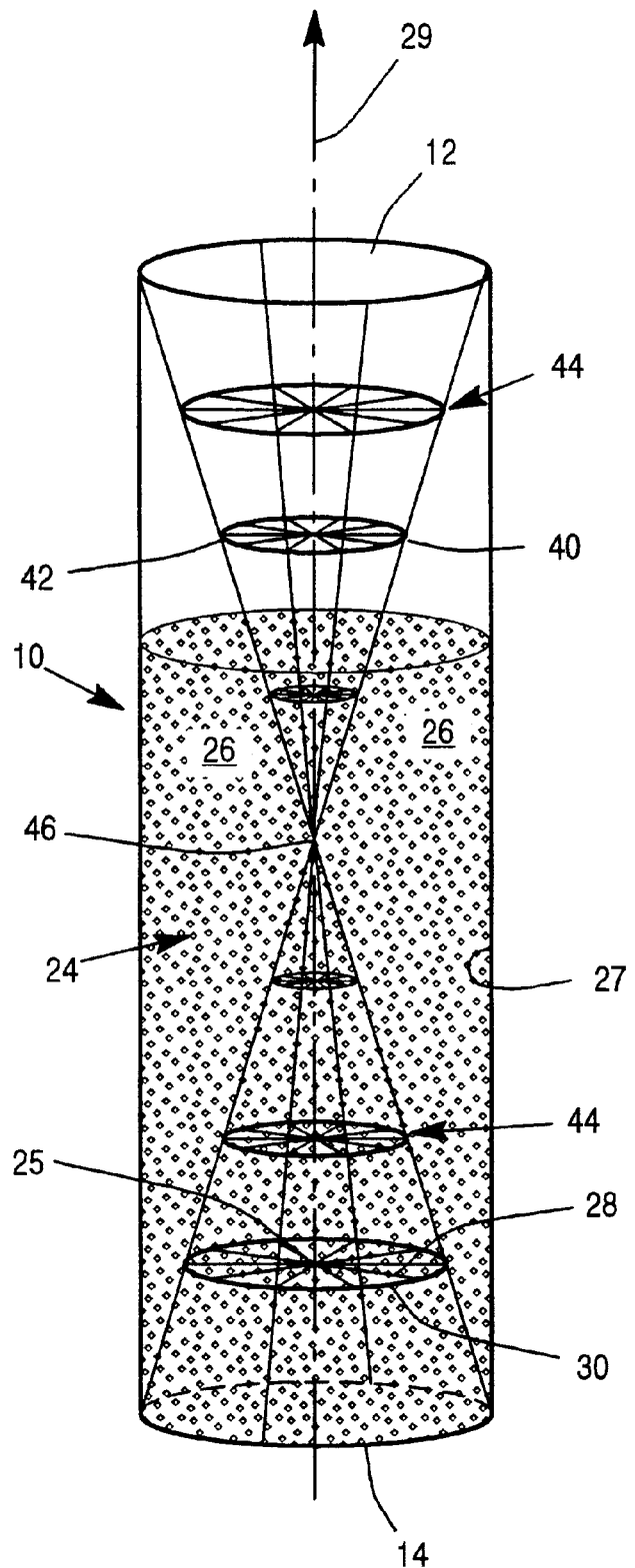
*Figure*

PASSIVE COLLISION DAMPING DEVICE

BACKGROUND OF THE INVENTION

This invention is directed to the damping of shock and vibration through the use of passive shock absorbing and damping devices. Particularly the invention is directed to an enclosure that contains a multitude of small damping particles, wherein restrictions to the free flow of these damping particles are provided by structures within the enclosures.

The enclosures have been filled with a multiplicity of rollable bodies or pellets, such as tungsten carbide to provide for shock absorption and damping. These particles typically have been provided in smoothed wall-hollowed enclosures, either with no other structure within the enclosure, or they have been used in conjunction with pistons where they have react against the movement of the piston. Many different type of materials have been employed and the type of material could be critical for some applications.

Examples of such prior art devices are found in U.S. Pat. No. 3,630,047 issued to Frank Arnold Turton on Dec. 28, 1971 entitled "Cryogenic Cooling Apparatus;" U.S. Pat. No. 3,938,625 issued to Gunther Radermacher, et. al. on Feb. 17, 1976 entitled "Vibration Damping Device Especially for Protecting Pipelines from Earthquakes;" U.S. Pat. No. 4,173,130 issued to Wayne N. Sutliff, et. al. on Nov. 6, 1979 entitled "Drilling Shock Sub"; U.S. Pat. No. 5,027,715 issued to Archie S. Moore, et. al. on Jul. 2, 1991 entitled "Shock Absorbing Carrier", and U.S. Pat. No. 5,632,206 issued to Gareth D. Summa, et. al. on May 27, 1997 entitled "Adjustable Cushion Tow Bar for Power and Free Conveyor."

Other Prior Art examples are found in U.S. Pat. No. 1,294,467 issued to John N. Hovas on Feb. 18, 1919 entitled "Shock Absorber;" U.S. Pat. No. 2,155,052 issued to Conrad Friedrich Byland on Apr. 18, 1939 entitled "Means for Destroying the Energy of Mass Oscillations of Solid Bodies;" U.S. Pat. No. 2,869,700 issued to George W. Bowden on Jan. 20, 1959 entitled "Positive Clutch with Damping Arrangement;" U.S. Pat. No. 3,456,782 issued to John D. Miller in Jul. 22, 1969 entitled "Package for Elongate Frangible Articles Having Wide Thin Extremity Portions;" U.S. Pat. No. 3,899,100 issued to Raymond L. Rigaud on Aug. 12, 1975 entitled Container for Packaging an Object;" U.S. Pat. No. 4,858,738, issued to Fernando Novoa on Aug. 22, 1989 entitled "System of Auxiliary Mass Dampers to Restrain the Response of Slender Elastic Structures to Vibrations such as From Earthquakes;" U.S. Pat. No. 5,020,644, issued to Fernando Novoa on Jun. 4, 1991, entitled "Auxiliary Mass Damper for Slender Flexible Element Subject to Vibration;" U.S. Pat. No. 5,306,100 issued to David D. Higginbotham on Apr. 26, 1994, entitled "Void Filler;" U.S. Pat. No. 5,486,078 issued to Wise et. al on Jan. 23, 1996, entitled "Reusable Void Filler and Construction Method Therefore;" Document SU-1084504A, published Apr. 7, 1980 in the name of Briskin, et. al., and Document SU-1392277A, dated Apr. 30, 1988 in the name of Oganyan, et. al.

In this type of damping device, collisions of a multitude of particles that are set into motion during the occurrence of a shock, or vibration results and translates energy applied to the device into momentum and heat. These particles generally have a high density and, as they are accelerated, the turbulent motion of the particles results in energy translation from the enclosure wherever the enclosure is engaged by the particles. The particles thus dissipate the energy of the applied force by particle collisions and frictional loses with the walls of the enclosure. Spaced-apart substantially solid disks in a container filled with particulate material to create damping are also shown in U.S. Pat. No. 1,294,467 issued to J. N. Novak and filed Feb. 18, 1919, where they are employed in conjunction with a piston.

Although active damping shock absorber devices have many applications, there are many applications where the cost and complexity of such devices is undesirable. The present invention, by incorporating passive structures of a unique construction and arrangement into the interior of these smooth wall enclosures, provides structure in the interior of the enclosure that restricts the free flow of the damping materials, thereby substantially improving the damping and absorbing characteristics of this type of shock absorbing device.

BRIEF SUMMARY OF THE INVENTION

A device for dissipating mechanical forces is provided by a partially filled, sealed circular cylindrical container partially filled with particulate material. Wheel-like structures with rims and spokes located in the interior of the container which have dimensional variations that substantially increase the flow resistance encountered by said particulate material in the container over the flow resistance encountered by the particulate material without the dimensional variations.

In the disclosed embodiment, a circular cylindrical container with two sealed ends has an elongated central axis, and a plurality of structures are positioned at spaced apart intervals along the elongated axis. Each of said structures is formed by:

- a circular rim that has a circular circumference that is proportioned in size to the distance that the structure is positioned along the elongated axis from the centroid of a circular cylindrical container along the elongated central axis toward one of the sealed ends;
- a plurality of substantially straight spokes, each of which projects from the rim to join with the other spokes at the center of the rim; and a plurality of support wires that extend between the first sealed end and the second sealed end and are connected so as to support the rims in planes substantially normal to the elongated axis of the circular cylindrical container.

BRIEF DESCRIPTION OF THE DRAWING

The FIGURE is a diagrammatic showing of the interior of the invention in which wire supports crisscross at the center of the cylindrical container along the elongated central axis to a number of circular wheel-like structures with rims and spokes that extend from the rims to the center of the wheel-like structures on the elongated axis. The wheel-like structures are positioned at spaced-apart locations along the elongated axis and have an increasing radius from the centroid of the circular cylindrical container to the end of the container.

DETAILED DESCRIPTION OF THE INVENTION

The present invention provides an increased amount of turbulent and chaotic interaction of damping particles, such as graphite particles or rollable balls, or other suitable particulate material that are well known in the art, to improve the damping characteristics of a container for the particulate material. With this invention, passive damping may be tuned for specific application.

The FIGURE shows an embodiment of the invention in which two or more support wires 40, 42 are strung from one sealed end 12 of the container to the other sealed end 14 so they crisscross at the centroid 46 of the interior of the circular cylindrical container along its elongated central axis 29. The wires 40 thus form a support structure for the circular wheel-like structures 44 which have circular rims 30 and spokes 28 that extend from the rims 30 to the centers 25 of the wheel-like strictures. The damping particles 24 that partially fill the container interfere with the interior wall 27 and the wheel-like structures 44 when the container moves.

In this embodiment, the circumference of the rims of the wheel-like structures increase as they are located farther and further away from the centroid 46 toward one of the sealed ends 12 and 14 along the elongated centroid axis 29. This provides a very effective collision pattern that can be tuned to specific applications.

What is claimed:

1. A device for dissipating mechanical forces comprising:
   (a) a circular cylindrical container having a centroid located on an elongated central axis;
   (b) first and second sealed ends for sealing said container;
   (c) a plurality of wheel-like structures positioned at spaced-apart intervals from said centroid and along said elongated central axis, wherein each of said structures comprises:
      (1) a circular rim that has a circumference that is proportional in length to the distance that said structure is positioned along said elongated central axis from the centroid of said container toward one of said sealed ends; and
      (2) a plurality of spokes, each of said spokes projecting from said rim to join with the other of said spokes of the same wheel-like structure at the center thereof;
   (d) a plurality of support wires that extend between said first sealed end and said second sealed end and that are connected to each of said wheel-like structures wherein each of said wheel-like structures lies substantially in its own separate plane that is normal to said elongated central axis, said container; and
   (e) particulate material in said container that partially fills said container.

\* \* \* \* \*